United States Patent [19]

Helsene et al.

[11] Patent Number: 4,662,029

[45] Date of Patent: May 5, 1987

[54] PROCESS AND APPARATUS FOR CUTTING HOG CARCASSES

[75] Inventors: Larry E. Helsene; Kenneth P. Regner, both of Austin, Minn.

[73] Assignee: Geo. A. Hormel & Co., Austin, Minn.

[21] Appl. No.: 795,445

[22] Filed: Nov. 6, 1985

[51] Int. Cl.$^4$ .............................................. A22C 17/00
[52] U.S. Cl. ......................................... 17/52; 17/1 R; 17/23
[58] Field of Search ........................ 17/1 R, 52, 24, 45, 17/23; 83/106, 205, 221, 267, 365, 367, 368, 370

[56] References Cited

U.S. PATENT DOCUMENTS

| | | | |
|---|---|---|---|
| 3,148,715 | 9/1964 | Alter | 83/106 X |
| 3,177,520 | 4/1965 | Vogt et al. | 17/1 R |
| 3,916,484 | 11/1975 | Kennedy | 17/23 X |
| 3,995,350 | 12/1976 | Ekstam | 17/23 |
| 4,118,777 | 10/1978 | Wallace | 17/23 X |
| 4,557,014 | 12/1985 | Vogt et al. | 17/1 R |

Primary Examiner—Willie G. Abercrombie
Attorney, Agent, or Firm—Herman H. Bains

[57] ABSTRACT

A process and apparatus for automatically and continuously cutting hog carcasses into primal cuts includes means for moving the hog carcasses in a predetermined path of travel. The carcasses are first separated into carcass sides and are conveyed on adjustable support mechanisms. Optical scanning devices view each primal cut portion of each carcass to locate a reference structure on the primal cut portion. The scanned reference structure is compared to a programmed cut pattern by a computer which controls operation of a plurality of cutting devices. The cutting devices are adjusted in response to the comparison of the scanned reference structure of the primal cut with the pre-programmed cut pattern. The computer program will include many cut patterns for each primal cut. The computer may be programmed daily, or in more frequent intervals, to select a particular cut pattern for each primal cut. The computer selects the desired cut pattern which has been predetermined for that particular time. Each cutting device is operable for cutting a specific primal cut in conformity to the programmed cut pattern.

10 Claims, 4 Drawing Figures

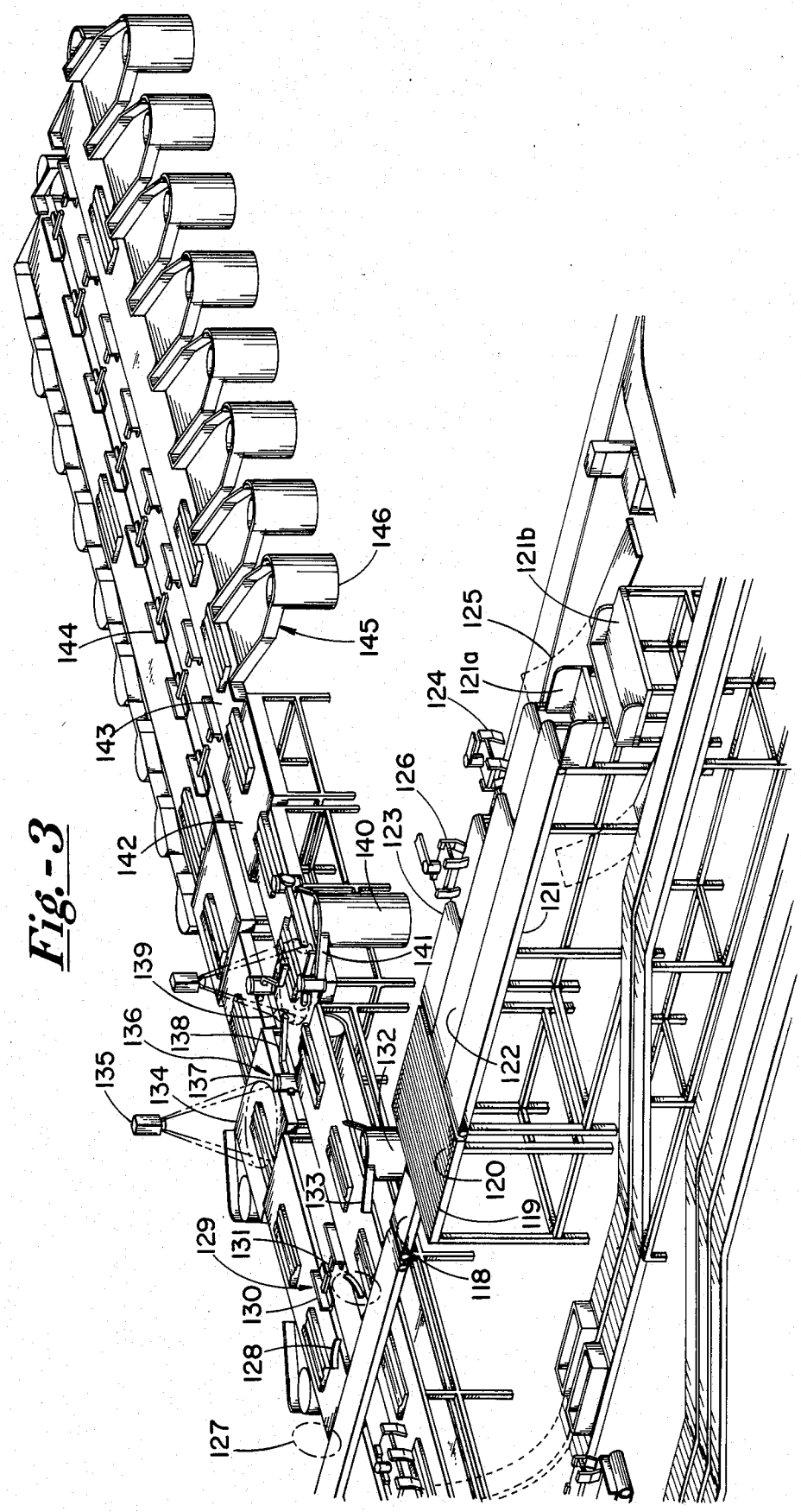

PROCESS AND APPARATUS FOR CUTTING HOG CARCASSES

This invention relates to a process and apparatus for automated selected cutting of hog carcasses into primal cuts.

BACKGROUND OF THE INVENTION

In commercial packing houses, animal carcasses are bled, eviscerated, skinned and moved to a cooler for chilling. Thereafter, the carcasses are conveyed to the cutting floor where the carcasses are cut into primal cuts. For example, each hog carcass side is typically cut into wholesale or primal cuts, including the hind foot, front foot, ham, shoulder, loin, spare ribs, and belly. The cutting operation is labor intensive and the cuts made by the butchers are not consistently accurate to produce the most effective yield. Since hog carcasses vary in size and build, and because primal cuts are not defined by precise symmetry, it has been difficult to develop an automated butchering system.

SUMMARY OF THE INVENTION

It is a general object of this invention to provide a novel, high production process and apparatus for automatically and accurately cutting hog carcasses into primal cuts.

It is another object of this invention to provide a continuous process and apparatus for cutting hog carcasses into primal cuts in which each hog carcass is moved in a predetermined path of travel and is optically scanned, and the scanned images are compared to preprogrammed images to automatically adjust each carcass for selective cutting by controlled cutting media.

A further object of this invention is the provision of the novel process and apparatus in which hog carcasses are conveyed along a predetermined path of travel and are automatically cut in a predetermined sequence into primal cuts, including the hind foot, ham, front foot, shoulder, loin, ribs, and belly.

These and other objects of the invention are more fully defined in the following specification.

FIGURES OF THE DRAWING

FIG. 3 is a diagrammatic perspective view of the remaining portion of the apparatus.

DESCRIPTION OF THE PREFERRED EMBODIMENT

Figure 1:
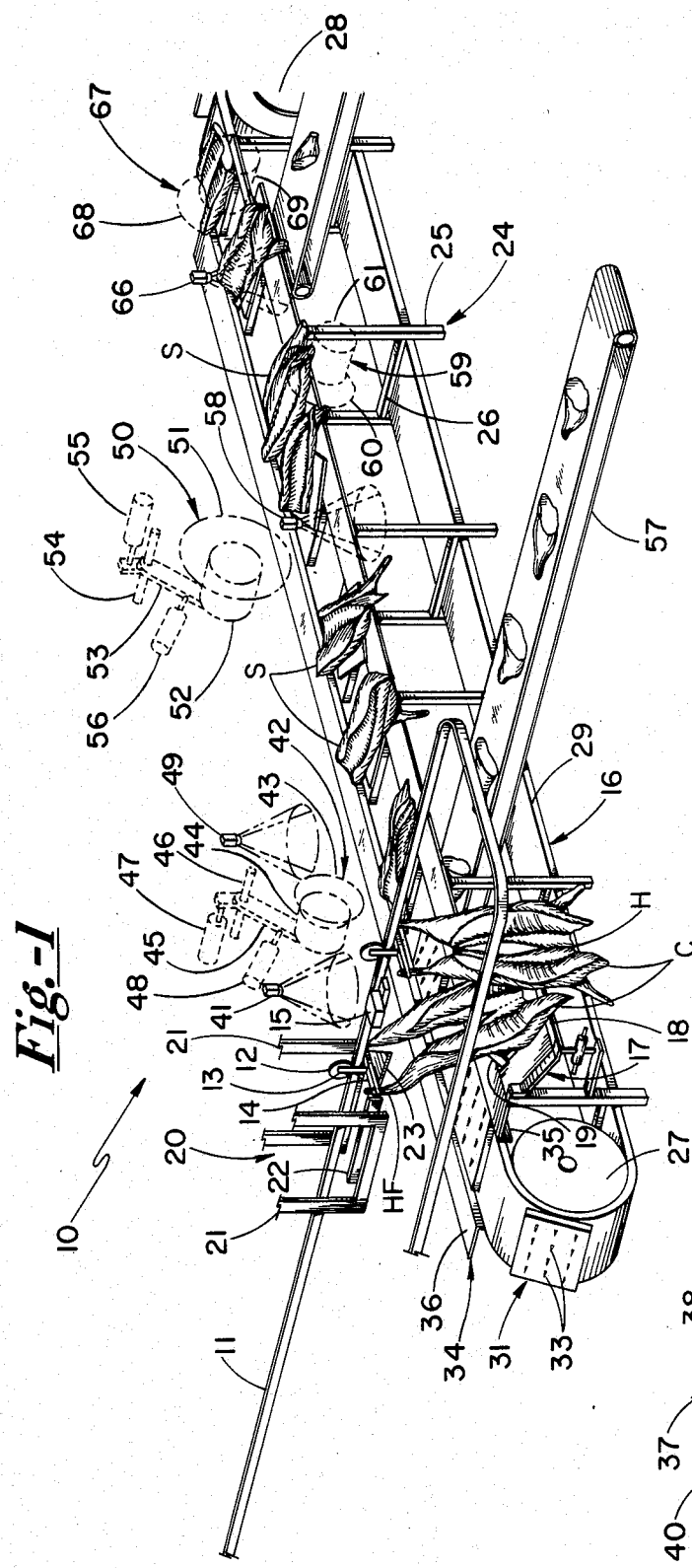
FIG. 1 is a diagrammatic perspective view of the front portion of the apparatus illustrating the initial cutting steps.

Referring now to the drawings and, more particularly, to FIG. 1, it will be seen that one embodiment of the novel process and apparatus for automatically and accurately cutting hog carcasses into primal cuts is thereshown. The apparatus, designated in its entirety by the reference numeral 10, includes an overhead conveyor 11 which conveys the hog carcasses from the chill cooler to the hog cut apparatus. The hog carcasses C are suspended from the overhead conveyor 11 by a trolley 12, which is provided with a depending strap 13 that is connected to an elongate gambrel 14. The gambrel 14 has pointed ends which project through openings in the hind feet of the carcass C. It will be appreciated that hog carcasses are typically suspended from an overhead trolley by gambrels, such as the gambrel 14. The gambrels project through incisions in the hind feet adjacent the cord or achilles tendon area.

The strap 13 of each trolley has a small bar code label applied to one surface thereof which contains a unique number that identifies that trolley. The carcass grade, weight, backfat thickness and other dimensions of the particular hog suspended from that trolley were established at the grade and yield station during the dressing process. This information was linked to the unique number, as read by a laser bar code reader, as the trolley and suspended hog carcass exited the grade and yield station. The carcass information is, therefore, available from computer memory each time the bar code label is read by a laser scanner. This information is transmitted to a computer as each hog carcass is moved along the overhead conveyor towards the hog cut apparatus.

The hog cut apparatus 10 includes a conveyor device 16 upon which the hog carcasses C are placed. The hog carcasses C are comprised of a pair of carcass sides which are joined together at the shoulder area by a small connecting portion of skin A. During the hog cutting operation, each of the sides S of the hog carcass are cut into primal cuts as the carcass sides are moved through a predetermined path of movement.

As the hog carcasses C are moved towards the receiving end of the conveyor device 16, the lower end portion or shoulder portion of the carcass engages the front edge 18 of an inclined support 17. It will be noted that the inclined support 17 is positioned adjacent the receiving end of the conveyor device 16 and is also positioned in confronting relation with respect to the hog carcasses C, as they are moved by the overhead conveyor. When the shoulder portion of the hog carcasses engages the front edge 18 of the inclined support, the hog carcasses are inclined and are pulled along the upper surface of the support 17. An elongated blade 19 projects upwardly from the inclined support 17 adjacent its upper end and is positioned to cut the connecting skin portion A of each carcass as it is pulled over the inclined surface by the overhead conveyor.

The hog cut apparatus also includes a cord cutter 20, which is positioned above the conveyor device 16 and is positioned in the path of travel of the trolley 12 and the gambrel 14. The cord cutter device 20 includes a support frame 21, which may be secured to any support structure and a pair of guide rails 22, each being spaced closely adjacent the support structure and each being disposed in substantially parallel relation with the overhead conveyor rail 11. A generally triangular shaped blade 23 is supported between the guide rails 22 and in obstructing relation with respect to those portions of the hind legs of the carcass that are engaged by the gambrel 14. As the carcass is moved by the overhead conveyor, the cord or achilles tendon portion of the hind legs will be cut by the triangular blade, thereby allowing the carcass sides to drop upon the conveyor device 16.

The conveyor device 10 adjustably supports each carcass side S and includes a support frame 24, which is comprised of a plurality of vertical frame elements 25 joined together by transverse frame elements 26. The conveyor device includes a drive roll 27 which is spaced downstream from a driven roll 28, and an endless conveyor belt 29 is trained about these rolls. The conveyor device includes an endless chain 30 secured to the endless conveyor belt 29, which is provided with a plurality of longitudinally spaced apart bearing sleeves 32a secured thereto for movement therewith.

A plurality of substantially rectangular shaped platens 31 are provided, each having a pivot pin 32 affixed thereto and projecting therefrom into one of the bearing sleeves 32a. It will, therefore, be seen that each of the platens 31 is pivotally secured to the chain 30 to permit rotation of the platens in either direction about a vertical pivot. Each platen may be provided with a friction brake interposed between each bearing sleeve 32a and each platen pivot 32, which serves to retain the platen in place once the platen has been moved to an adjusted position. It will also be noted that each platen has a plurality of spikes or pins 33 projecting upwardly therefrom. These pins serve to retain the carcass sides in a predetermined position upon the platens.

The conveyor device 16 also includes a pair of elongate L-shaped supports, each being mounted on the support frame 24 adjacent the upper portion thereof and extending longitudinally adjacent each side of the endless conveyor 29. Each L-shaped support includes a vertical support element 35 and a horizontal support element 36 integral therewith and projecting outwardly and horizontally therefrom. It will be noted that the horizontal support elements 36 support the extremities of the carcass sides S during movement of the carcass sides by the conveyor device.

Figure 4:
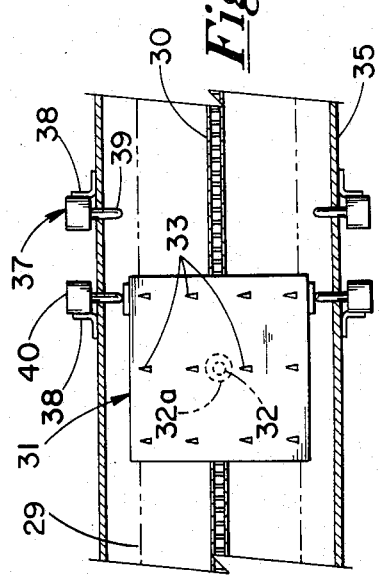
FIG. 4 is a diagrammatic top plan view of a portion of the conveyor device illustrating details of construction thereof.

Means are provided for shifting each platen from a normal aligned position to an adjusted position during the cutting operation. The platens have their side edges parallel to the side edges of the L-shaped support when in the normally aligned position. However, the platens may be angularly adjusted to permit cutting of the carcass in a predetermined manner. Referring now to FIG. 4, it will be seen that the means for adjusting the platens 31 during movement thereof to an adjusted position comprise a plurality of pairs of adjusting servo-mechanisms 37, each being mounted on the vertical support elements 35 of the L-shaped supports 34. In this regard, the adjusting servo-mechanisms 37 are arranged in opposed pairs, as best seen in FIG. 4, and there are two pairs associated with each location where a cutting action takes place.

Each adjusting servo-mechanism includes an extensible and retractable finger 39 which projects from the housing or cylinder 40. Hydraulic fluid under pressure may be used to extend and retract finger 39 for each adjusting mechanism. With this arrangement, it will be seen that a pair of adjusting mechanisms 37 on one side of the platen at a particular location may be extended to forcibly pivot the platen about its vertical pivot to an adjusted position. It will be appreciated that the fingers 39 of the opposed pair of adjusting mechanisms will remain in a retracted position. The friction brake will retain the platen in the adjusted angular position.

In the embodiment shown, the first cutting operation cuts the hind foot HF from each carcass side, and this particular cut is made in a predetermined manner with respect to the particular carcass side involved. In this regard, a hind foot saw positioning camera 41 is mounted above the conveyor device 16 and is positioned to view the hind foot portion of each carcass side as the carcass sides are moved by the conveyor device. The hind foot saw positioning camera is a vision system manufactured by View Engineering, of Shelton, Conn., and is used to locate a particular reference point on that portion of the hog carcass between the small end of the ham and the upper end portion of the hind foot. The location of the reference point is transmitted to a computer for the purpose of adjusting the position of the hind foot saw 42 and platen 31.

It is pointed out that the first set of adjusting mechanisms 37 are located downstream of the hind foot saw positioning camera. The location of the reference point of the hind foot by the ham saw positioning camera is transmitted to the computer, which then adjusts the position of the hind foot saw 42 and the platen 31 in response to this information and the information from the laser bar code reader 15. The hind foot saw 42 includes a rotary blade 43, which is revolved by a suitable electric or hydraulic motor 44. The hind foot saw is mounted for vertical swinging movement and lateral translation relative to the platen and the carcass side supported thereon. In this regard, the hind foot saw is mounted on a bracket or support member 45, which is swingably and slidably mounted on a shaft 46. A hydraulic piston and cylinder unit 47 is connected to the support member 45 and is operable to vertically swing the support member and hind foot saw during extension and retraction of the unit.

A second hydraulic piston and cylinder unit 48 is connected to the support member 45 and extension and retraction of the unit 48 produces lateral translation of the hind foot saw towards and away from the conveyor device 16. With this arrangement, it will be seen that the hind foot saw will be adjusted in response to the information pre-programmed in the computer and in response to the information transmitted by the ham saw positioning camera and the laser bar code reader 15. After the platen and hind foot saw are adjusted, the hind foot saw will be moved to cut the hind foot from the carcass side. The hind foot will be collected in a suitable collection bin or on a collection conveyor and the hind feet will be taken to other locations for further processing.

A ham saw positioning camera 49 is positioned above the conveyor device 16 downstream of the hind foot saw 42. The ham saw positioning camera is identical in construction and operation to the hind foot saw positioning camera 41 and is a viewing system which views the carcass side S to locate a reference point relating to the ham H of the carcass side. This information is transmitted to the computer and the platen is adjusted by the sets of adjusting mechanisms located downstream of the ham saw positioning camera 49. The computer also adjusts the ham saw 50 in response to this information.

The ham saw 50 is similar to the hind foot saw, but is slightly larger and includes a rotary blade 51 driven by a suitable rotary motor 52, which is mounted on a support member 53. The support member 53 is swingably and slidably mounted on a shaft 54. A hydraulic piston and cylinder unit 55 is connected to the shaft 54 for causing vertical swinging movement of the ham saw 50 during the cutting operation. Another hydraulic piston and cylinder unit 56 is connected to the support member 53 for producing lateral translation of the ham saw relative to the ham to be cut. After the platen and ham saw are adjusted, the ham saw will cut the ham from each carcass side and these hams are conveyed by a ham conveyor 57 to a ham weight classifying system.

A front foot saw positioning camera 58 is positioned downstream of the ham saw and is identical in construction and operation to the other positioning cameras. It is pointed out that the front foot saw positioning camera 58 locates a reference point on the front foot of the carcass side and transmits this information to the computer, which acts in response to this information to adjust the platen and also adjust the front foot saw 59.

The front foot saw 59 also includes a rotary blade 60 driven by a rotary motor 61, which is mounted on a support member (not shown). The front foot saw 59 is substantially identical to the hind foot saw. The support member (not shown) for the front foot saw is swingably and slidably mounted on the shaft (not shown). A pair of hydraulic piston and cylinder units (not shown) are operable to cause lateral translation and vertical swinging movement of the front foot saw in the manner of the hind foot saw.

It is again pointed out that another set of the adjusting servo-mechanisms 37 will be positioned downstream of the front foot saw positioning camera 58 and will be operable to adjust the platen in response to the information transmitted by the positioning camera 58. Similarly, the front foot saw 59 will be adjusted to the desired position and the saw will be moved to cut the front foot from the carcass side.

A shoulder saw positioning camera 66 is positioned downstream of the front foot saw and will scan the carcass side to locate a reference point with respect to the shoulder SH of each side S. The information scanned by the vision system 66 will be transmitted to the computer to adjust the platen 31 and the shoulder saw 67 accordingly. It will be noted that the shoulder saw 67 is positioned downstream of the shoulder saw positioning camera 66 and includes a rotary blade 68 driven by a motor 69, which is mounted on an elongate support member (not shown). The shoulder saw is substantially identical to the ham saw so that the support member (not shown) is swingably and slidably mounted on a shaft (not shown). A pair of hydraulic piston and cylinder units (not shown) are connected to the support member for producing lateral translation and vertical swinging movement of the shoulder saw in the manner of the ham saw 50.

After the platen and shoulder saw have been properly positioned in response to the information transmitted by the shoulder saw positioning camera, the shoulder saw will cut the shoulder from the carcass side and the shoulder will be conveyed away by a shoulder conveyor positioned below the conveyor device 16. It is pointed out that the shoulder saw 67 is similar to the ham saw 50.

After the shoulder, ham, front foot, and hind foot have been removed from each carcass side, each carcass side is then conveyed by the conveyor device 16 by means of guide members 74 to a transfer conveyor 75. The transverse conveyor 75 is provided with a suitable transverse conveyor frame and has its feed end located adjacent the discharge end of the conveyor device 16. At this point, the carcass side consists of the loin, ribs, and belly, and these primal cuts are removed in successive operations.

It will be seen that the transfer conveyor 75 is positioned between a pair of elongate substantially identical conveyor devices 77. It will also be noted that the carcass sides S are positioned in transversely extending relation with respect to the transverse conveyor and are removed therefrom and placed on one of the conveyor devices 77 by a pick and place robot machine 79.

The pick and place robot machine 79 is a commercial model of a machine manufactured by Pick-O-Matic Systems, of 37950 Commerce Drive, Sterling Heights, Mich. The machine 79 includes a support 80 having an elongate arm 79 mounted thereon for vertical translation and lateral swinging movement relative thereto. The arm 81 has a product engaging mechanism 82 mounted at its outermost end and this product engaging mechanism has a plurality of pairs of gripping members 83 depending therefrom. The pick and place robot machine 79 will grip each carcass side S as the carcass sides are successively advanced and will position one carcass side on the left conveyor and will position the next carcass side on the right conveyor. In this regard, all of the carcass sides positioned on the right conveyor will be from the right side of the carcass and all of the carcass sides positioned on the left conveyor 77 will be from the left side of the carcass. It is contemplated that an operator will be positioned between the conveyors 77 to make a general inspection of the carcass sides and to align the carcasses for continued movement down these conveyors.

Each of the conveyor devices 77 has a camera housing 84 mounted on the support frame 78 thereof and each camera housing has an opening 85 at each end through which the conveyor belt 79a of each conveyor 79 moves. The openings 85 in each camera housing 84 are each closed by a closure flap 86 which is hingedly mounted to the camera housing to permit the carcass sides to freely move into and through the housing. With this arrangement, the interior of each of the camera housings is substantially closed against all ambient light.

Each camera housing 84 has a camera 87 positioned therein and each housing is also provided with a light source device 88 which is preferably a strobe light for producing intense flashes. With this arrangement, the reference points of the loins and ribs will be located by the vision system camera at a plurality of points, since the loin and ribs have a relatively large length dimension. This information is transmitted to the computer which controls a scribe saw 89 mounted above each conveyor device downstream of the camera housing 84. Although the scribe saw 89 is only diagrammatically illustrated, it is a rotary saw and is substantially identical to the hind foot saw and front foot saw. Therefore, the scribe saw is mounted for vertical swinging movement, as well as lateral translation, relative to the carcass side. When the scribe saw is properly positioned in response to the information transmitted to the computer which operates the scribe saw, the scribe saw will make a longitudinal shallow cut in the carcass side along the longitudinally extending loin throughout the length of the carcass ribs.

Referring again to FIG. 2, it will be seen that the entire computer apparatus 90 is enclosed in a housing 91, and the computer is programmed to control the various cutting operations in response to information received from the various vision system cameras and in response to preprogrammed information from the laser bar code reader relating to the dimensions of the complete carcass. The computer controls all of the saws, as well as adjustment of the platens.

A pick and place machine 92 is positioned between the conveyors 77 and is identical in construction to the pick and place machine 79. Operation of the pick and place machine is controlled by the computer in response to information transmitted to the computer by the camera vision systems in the housings 84. The pick and place machine 92 will remove carcass sides which are oversized, undersized, or damaged. The rejected carcass sides are positioned upon a transfer conveyor 93 which moves the rejected carcass sides to a processing conveyor 94. These carcass sides will be processed manually in a manner to be described hereinbelow.

The carcass sides which are not rejected are moved by the conveyor device 79 to the loin pulling station. In this regard, each conveyor device 77 is provided with an endless urethane hold-down conveyor 95 mounted above each conveyor 77 in close proximity thereto. Each hold-down conveyor 95 is operable to hold the loin in a horizontal position as the loin is moved into the loin puller device. Each hold-down conveyor 95 comprises a plurality of laterally extending slats 96 which are secured to belts trained about a drive roller 97 and a driven roller 98. It will be seen that the hold-down conveyors are driven in a direction to move the loins downstream into the loin puller device 99.

Figure 2:
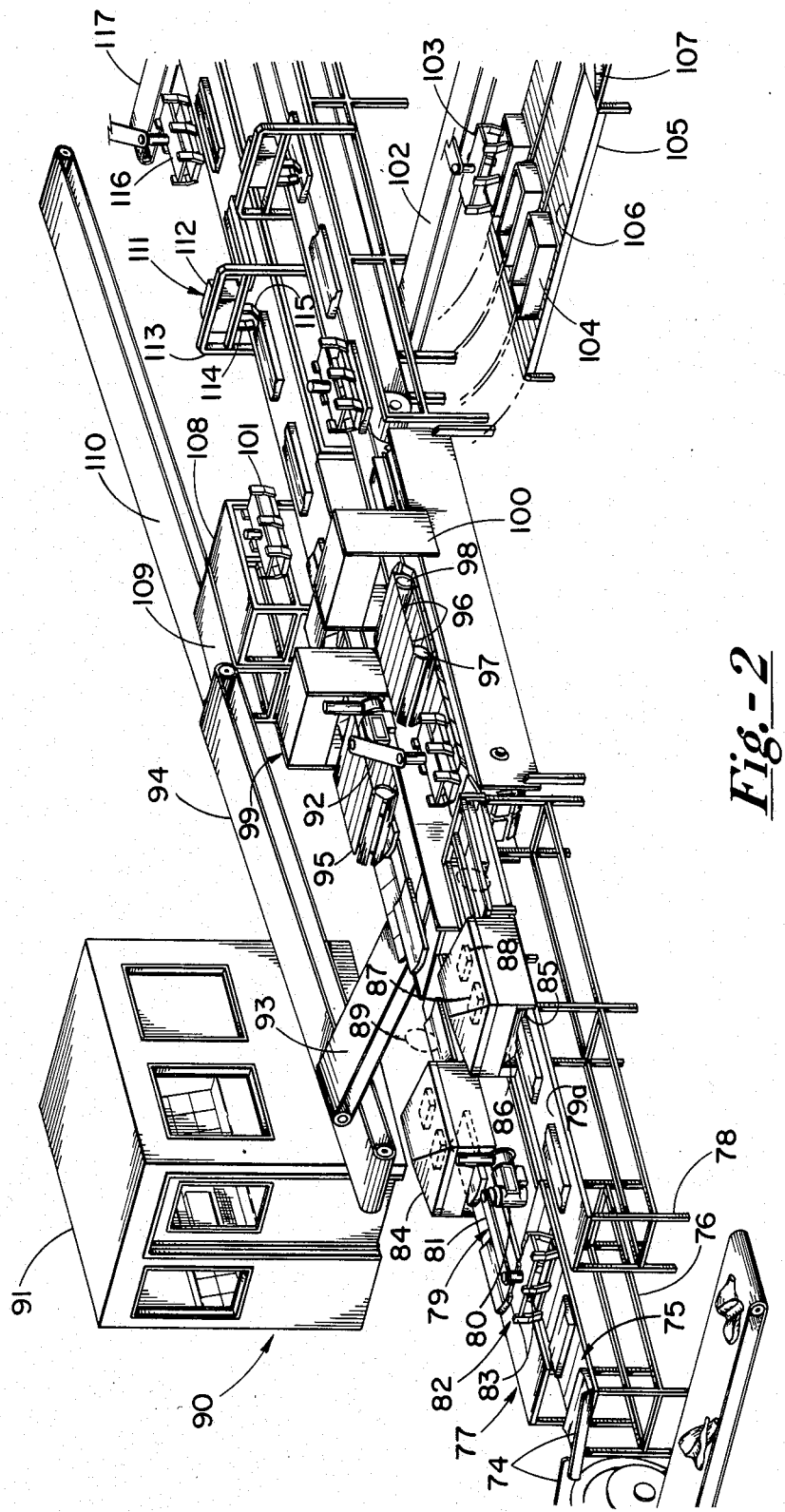
FIG. 2 is a diagrammatic perspective view of the central portion of the apparatus.

The loin puller device 99 includes a housing 100, as best seen in FIG. 2. The housing contains the various components of the loin puller device, including a U-shaped loin knife, and these components are disclosed in my co-pending application Ser. No. 890,512, filed July 30, 1986, entitled "Apparatus For Removing Loins From Carcass Sides", which is incorporated by reference herein. The U-shaped loin knife is adjustable to cut the loin in accordance with the instructions from the computer, which were transmitted from the vision system camera. The loin L will be pulled or cut from the side S, but will remain positioned upon the carcass side after the carcass side has moved through the loin puller device.

The loins positioned upon each carcass side will be removed from the carcass side by a pick and place machine 101, which is identical in construction to the pick and place machine 79. The loins will be conveyed by the loin conveyor 102 to a transfer location, where a pair of pick and place machines 103 place the loin in boxes 104 that are positioned upon support devices 105, each having a plurality of transversely extending rollers that support the loin boxes for movement to conveyor devices 107. It will be noted that the support devices are arranged in side-by-side relation on opposite sides of the loin conveyor 102, which permits continuous transfer of the loins from the loin conveyor 102.

The carcass sides, which are transferred to the processing conveyor 94 are transferred to a manual loin station 103 where the loins are positioned upon a table 109 and the loins are manually cut or pulled by an operator. The rib and belly portion of the carcass are placed upon a conveyor 110 where the ribs are manually removed and the bellies are manually cut. The loins L, which are manually removed, are placed upon the loin conveyor 102 by a pick and place robot machine.

After the loins have been removed from the sides by the pick and place machine, the sides S are conveyed by each conveyor device 77 to a rib puller device 111. Each rib puller device 111 includes a housing 112 which is supported by a frame 113 above the associated conveyor device 77. A pair of elongate blade support elements 114 project downwardly from the housing and each is connected to one end portion of a V-shaped blade 115. The housing 112 contains the control elements for vertically adjusting the V-shaped blade 115 and for laterally adjusting one of the blade support elements 114 relative to the other.

During operation of the rib puller device, the V-shaped blade is adjusted and controlled by the computer 90 in response to the information conveyed to the computer by the vision system camera 87. The V-shaped blade 115 will be vertically adjusted to the depth of the cut made by the scribe saw 89, and will be laterally adjusted in response to the general configuration of the ribs, as seen by the vision system camera 87.

After the ribs have been separated from the side S, the ribs will remain positioned upon the side and will be removed therefrom to the associated conveyor device 77. A pair of pick and place machines 116 are positioned adjacent the conveyors 77 downstream of the rib pullers, and these pick and place machines 116 remove the ribs from the sides and place the ribs upon a rib conveyor 117. It is pointed out that the pick and place machine 116 is identical in construction to the pick and place machine 79.

The rib conveyor 117 conveys the ribs to a weighing station where the ribs are weighed on a scale 118 and are then placed at a selected location on a rib channelizer support 119. The rib channelizer support 119 includes a plurality of horizontal transverse sliders 120, which allow the ribs to move to one of a plurality of conveyors. One of the conveyors 121 will convey the heavy ribs to a collection bin or receptacle 121a, as best seen in FIG. 3. The heavy ribs will then be transferred to cutting boards 121b where the ribs will be manually cut.

Medium size ribs will be conveyed by a conveyor 122 where the ribs will be removed by a pick and place machine 124, and are transferred to boxes and then placed on a box ribbed conveyor 125.

The lightweight ribs are received from the rib channelizer support by a conveyor 123, and these ribs are removed by a pick and place machine 126 and placed in boxes which are then conveyed by the box rib conveyor 125 to a remote point.

After the ribs have been removed from the sides S, the only remaining portion of the side is the belly B. The bellies actually constitute a primal cut, but require additional trimming for processing into bacon.

Each conveyor device 77 has a fatback knife 127 positioned thereabove, and the fatback knife is diagrammatically illustrated, but is supported for vertical movement and lateral translation relative to the bellies B in the same manner as the other saws or knives. Therefore, the fatback knife 127 will be substantially similar in construction to the scribe saw 89, as well as the earlier saws, such as the ham saw. The fatback saw will be rotated by a rotary motor and will be supported on a support member, which is vertically swingable and is laterally shiftable relative to a shaft. Hydraulic or pneumatic piston and cylinder units may be used to adjust the position of the fatback knife.

The fatback knife 127 will cut a 3-inch strip from the bellies along that longitudinal edge thereof which was closest to the backbone of the side. It will be appreciated that the backbone will have been removed in the loin pulling operation. The 3-inch strip of fat will engage a plow 128 positioned along the associated conveyor 77 in obstructing relation with respect to a strip of removed fat and will be plowed from the conveyor into a receptacle (not shown).

The position of the fatback knife is controlled by the computer in response to the information conveyed thereto by the vision system camera 87. The camera 87 also reads the overall size of the bellies and this information is transmitted to the computer. The computer operates a pair of kickoff devices 129 which remove commercial grade bellies from the conveyor. Each kickoff device includes an L-shaped belly engaging member 130, which has an arm 131 connected thereto and the arm will be connected to an actuator, such as a hydraulic piston and cylinder unit (not shown). A commercial grade belly is removed laterally from a conveyor device by one of the kickoff devices 129 into a receptacle 132 which is provided with guide members 133 to assure deposition of the bellies into the receptacle. It will be noted that each kickoff device 129 is positioned adjacent one of the conveyor devices 77.

The bellies B, which are to be trimmed, are conveyed by the conveyor 77 to a trimming conveyor 134 whose operation is controlled by a computer. Operation of the trimming conveyor will be interrupted and a vision system camera 135 positioned above the conveyor will read the configuration and size of the belly B and this information will be transmitted to the computer. The computer operates a plurality of trimming saws 136 associated with each trimming conveyor and, in the embodiment shown, four such trimming saws 136 are provided. Each trimming saw includes a housing 137 having an elongate arm 138 mounted therein and projecting therefrom. The outer end of the arm supports a rotary saw 139. The housing 137 contains drive components (not shown) which permit the arm to be retracted and extended. Each arm also contains drive means for revolving the saw 139.

Operation of the trimming saws is controlled by the computer in response to the information conveyed by the vision system camera 135. The saws will trim the bellies B into rectangular configuration and the trim material will be collected in suitable receptacles 140 provided with guide members 141. Each trimming conveyor will transfer the trimmed bellies to one of a pair of weighing conveyors 142 where each belly will be weighed and the bellies will then be transferred to one of a pair of sorting conveyors 133. A plurality of kickoff devices 144 identical in construction and operation to the kickoff devices 129 are located at spaced longitudinal points along each sorting conveyor 143. These kickoff devices are controlled by the computer. The weighing conveyors 132 transmit the weight of the bellies to the computer and the kickoff devices are controlled in response to the weighing information to selectively sort and discharge the bellies by weight into the various receptacles.

In operation, the carcasses C will be conveyed by the overhead conveyor 11 and trolleys 12 from the chill cooler to the hog cut apparatus 10. The laser bar code reader 115 will read the information on each bar code label 13 and transmit the associated carcass information to the computer 90. The hog carcasses C will then be moved along the inclined supports so that the connecting skin portion A is cut by the blade 19 to separate the carcass into the carcass sides S. The cord cutter device will cut the cord supporting the carcass from the gambrel and each carcass side will be lowered upon one of the platens 31.

It is pointed out that each platen will be disposed in aligned position as each carcass side S is positioned thereon. In this regard, simple camming or aligning rails will be positioned adjacent the conveyor device along the lower run of the conveyor to engage and align the platens before the platens are moved over the driven roller. It is also pointed out that the computer will be programmed with an extremely large number of pre-programmed cut patterns for each primal cut. After reading the particular reference point on the primal cut, the computer selects the correct pre-programmed cut pattern for the particular primal cut. Each particular cut pattern for each primal cut may be preselected or changed each day to provide accurate control over the yield.

The carcass sides will be impaled upon the spikes 33 and will be retained against movement relative to the associated platens. Each carcass side will pass below the hind foot saw positioning camera, which reads a certain reference point with respect to the hind foot and this information is transmitted to the computer 90. The computer operates the servo-adjusting mechanisms 37 to adjust the platen prior to the platen reaching the hind foot saw station. The computer also adjusts the hind foot saw so that an accurate cut is made to remove the hind foot from the carcass sides in a manner to provide maximum ham yield.

The carcass side is then conveyed by the conveyor device 16 until each carcass side is ready by the ham saw positioning camera 49 and the computer operates the adjusting mechanisms 37 to reposition the platen, if necessary, and to properly position the ham saw. The ham cut is in accordance with this information to provide the best yield. To this end, the cut will be made to favor the ham primal cut or to favor the loin primal cut, depending on the current prices of these respective products. The computer will be pre-programmed to adjust the predetermined coefficient of movement to produce these results.

The front foot saw positioning camera will read the carcass side S to locate the specified reference point for the front foot and this information will be conveyed to the computer which controls the adjusting mechanisms 37 associated with the front foot cutting station. The platen and the saw 59 will be readjusted and the front foot will be severed from the carcass side. The shoulder saw positioning camera will read the carcass side to locate the reference point relating to the shoulder cut, and the shoulder cut saw and platen will again be adjusted to provide the optimum cut for the shoulder.

The carcass sides S will then be transferred to the conveyor device 75 where the carcass sides will be removed by the pick and place machine 79 and placed upon the conveyor devices 77. The carcass sides will then be respectively read by the vision system camera 87 and this information is transmitted to the computer for controlling the operation of the scribe saw, the Pick-O-Matic machine 92, and the loin puller device 99. After the loins have been pulled, the loins will be removed and properly boxed and the sides S will be moved to the rib puller device. It is again pointed out that the computer 90 controls the operation of the rib puller device in response to the information read and transmitted by the vision system camera 87. The ribs will be separated from the sides and then removed therefrom, weighed, sorted, and boxed while the untrimmed bellies will be moved to the belly trimming station.

The commercial grade bellies will be removed from the conveyor devices 77, but the remaining bellies will be trimmed by the trimming saws 36. Operation of the trimming saws is controlled by the computer in response to the information read and transmitted by the belly trimming camera 135. Finally, the trimmed bellies will be weighed and sorted, thereby completing the operation.

It will be seen that this particular system is automated and permits optimum cutting of the primal cut to provide the best possible yield with respect to the overall value of each carcass side. This simply cannot be done in a manual operation on a consistent basis. It will, therefore, be seen that the present process and apparatus not only provides a great savings in labor, but also provides an economical system for producing the primal cuts.

Thus, it will be seen that we have provided a novel process and apparatus for automatically cutting hog carcass sides into primal cuts in a more efficient manner than any heretofore known comparable system.

What is claimed is:

1. A process for continuous mechanized controlled cutting of hog carcass sides into primal cuts including the hind foot, ham, front foot, shoulder, loin, ribs, and belly, said process comprising the steps of:

selecting a cut pattern for each of the primal cut portions of each specific hog carcass side in accordance with the size, dimensions, grade, and other information regarding each carcass side, continuously moving hog carcass sides in predetermined paths of travel, and, during said travel first moving each carcass side from a suspended vertical position to a horizontal position for support of each carcass side upon one of a plurality of movable angularly adjustable horizontal support media, then optically scanning each primal cut portion, including the hind foot, ham, front foot, shoulder, loin, ribs, and belly in a predetermined sequence with one of a plurality of optic scanning media, each optic scanning medium locating a reference structure on the particular primal cut portion being scanned, comparing the scanned reference structure of the hind foot, ham, front foot, shoulder, loin, ribs, and belly in said predetermined sequence with a pre-programmed cut pattern for the particular primal cut portion, mechanically shifting one of a plurality of cutting media and angularly adjusting each support media in said predetermined sequence and in response to each comparison of the scanned reference structure with the pre-programmed cut pattern for the hind foot, ham, front foot, and shoulder, and, after the mechanical adjustment of each cutting medium and angular adjustment of the support media, cutting each primal cut portion of each carcass side in said predetermined sequence and in accordance with said pre-programmed cut pattern to cut the hind foot, ham, front foot, and shoulder from the carcass side.

2. The process as defined in claim 1 wherein the hind foot, ham, front foot, and shoulder are cut from each carcass side during movement of the latter in the predetermined path of travel before the loin, ribs, and belly are cut from the carcass side.

3. The process as defined in claim 2 and continuing movement of each carcass side after the hind foot, ham, front foot, and shoulder have been cut therefrom, and then mechanically shifting each right carcass side to one path of travel and mechanically shifting each left carcass to a second path of travel, and thereafter cutting the loin, ribs, and belly from each carcass side.

4. An apparatus for continuous mechanized controlled cutting of carcass sides into primal cuts including the hind foot, ham, front foot, shoulder, loin, ribs, and belly, said apparatus comprising:

means for selecting cut patterns for each primal cut portion of each carcass side in accordance with the size and dimension of each specific carcass side, conveyor means for moving carcass sides through a predetermined path of travel including a plurality of horizontally disposed, angularly adjustable support mechanisms, means for angularly adjusting each support mechanism relative to the path of travel in response to each comparison of the scanned reference structure with the pre-programmed cut pattern for each hind foot, ham, front foot, and shoulder, a plurality of adjustable cutting devices positioned adjacent said conveyor means, said cutting devices being disposed in spaced apart relation with respect to each other along the predetermined path of travel, each cutting device being operable to cut a primal cut from a carcass side including the hind foot, the ham, front foot, shoulder, loin, ribs, and belly, a plurality of optical scanning devices positioned adjacent said conveyor means, said scanning devices being positioned in spaced apart relation with respect to each other along the predetermined path of travel, each optical scanning device being operable to locate a reference structure on one of the primal cuts including the hind foot, ham, front foot, shoulder, loin, ribs, and belly, and means for comparing the optically scanned reference structure with the pre-programmed cut pattern for each primal cut, said comparing means being operatively related to said cutting devices in controlling relation therewith, said comparing means being operable to adjust the position of each cutting device and to operate the latter in response to said comparison means whereby each cutting device will cut a primal cut portion from the carcass side in conformity with the pre-programmed cut pattern.

5. The apparatus as defined in claim 4 wherein said support mechanisms are interconnected together.

6. The apparatus as defined in claim 4 wherein each of said support mechanisms is pivotal about a vertical axis relative to the direction of travel thereof.

7. The apparatus as defined in claim 4 wherein said optical scanning devices are positioned above said conveyor means.

8. An apparatus for continuous mechanized controlled cutting of hog carcasses into primal cuts which include the hind foot, ham, front foot, shoulder, loin, ribs, and belly, comprising:

means for conveying hog carcasses in a predetermined path of travel including a first conveyor device, each hog carcass being suspended from said first conveyor device by a gambrel which penetrates the hind foot of each carcass, an inclined support positioned in confronting relation with said first conveyor device whereby each carcass is engaged by said inclined support to shift each carcass from a vertical to a horizontal position, skin cutting means on said inclined support for cutting the strip of skin extending between the shoulder portions of each carcass, cord cutting means adjacent said first conveyor means cutting the skin adjacent the gambrel to release the hog carcasses from the latter, a second conveyor device adjacent said inclined means and including a plurality of interconnected adjustable support mechanisms, each support mechanism supporting a carcass side in horizontal relation thereon when each carcass is cut by said skin cutting means and said cord cutting means, a plurality of adjustable cutting devices positioned adjacent said conveyor means, said cutting devices being disposed in spaced apart relation with respect to each other and each being operable to cut a primal cut from a carcass side including the hind foot, ham, front foot, shoulder, loin, ribs, and belly, a plurality of optical scanning devices positioned adjacent said second conveyor means, each optical scanning device being operable to locate the reference structure on one of the primal cuts including the hind foot, ham, front foot, shoulder, loin, ribs, and belly, and means for comparing the optically scanned reference structure with the pre-programmed cut pattern for each primal cut, said comparing means being operatively related to said cutting devices and in controlling relation therewith, said comparing means being operable to adjust the position of each cutting device and to operate the latter in response to said comparison means whereby each cutting device will cut a primal cut portion from the carcass side in conformity with the pre-programmed cut pattern.

9. A process for continuous mechanized controlled cutting of hog carcasses into primal cuts including the hind foot, ham, front foot, shoulder, loin, ribs, and belly, said process comprising the steps of:

continuously moving chilled eviscerated hog carcasses through a predetermined path of travel, each hog carcass including a pair of carcass sides joined together by a strip of skin extending between the shoulder portions of each carcass, each carcass being suspended from an overhead trolley by a gambrel penetrating the hind feet of each carcass, moving the lower portion of each hog carcass against an inclined surface to progressively shift each carcass from a vertical position to a horizontal position, and during said shifting movement of each carcass cutting the flesh of each hind foot of each carcass adjacent the gambrel and cutting the strip of skin adjoining the carcass sides whereby each carcass side is horizontally positioned upon one of a plurality of movable supporting media during the movement of said carcasses in said predetermined path of travel, continuing the movement of each carcass side in the predetermined path of travel and during said travel of each carcass side optically scanning each primal cut portion including the hind foot, ham, front foot, shoulder, loin, ribs, and belly in a predetermined sequence with one of a plurality of optic scanning media, each optic scanning medium locating a reference structure on the particular primal cut portion being scanned, comparing the scanned reference structure of the hind foot, ham, front foot, shoulder, loin, ribs, and belly in said predetermined sequence with a pre-programmed cut pattern for the particular primal cut portion, and mechanically shifting one of a plurality of cutting media in said predetermined sequence and in response to each comparison of the scanned reference structure with the pre-programmed cut pattern for each primal cut portion, and after each mechanical adjustment of each cutting medium, cutting each primal cut portion of each carcass side in said predetermined sequence and in accordance with said pre-programmed cut pattern.

10. The process as defined in claim 9 wherein each of said adjustable support media is angularly adjustable in response to each comparison of the scanned reference structure with the pre-programmed cut pattern for the hind foot, ham, front foot, and shoulder.

* * * * *